(12) United States Patent
Wang et al.

(10) Patent No.: US 10,286,482 B2
(45) Date of Patent: May 14, 2019

(54) WELD KIT AND METHOD FOR LIMITED ACCESS WELD JOINTS

(71) Applicant: Caterpillar Inc., Peoria, IL (US)

(72) Inventors: Huijun Wang, Peoria, IL (US);
Kendall Reed Powell, New Braunfels, TX (US); Yan Shao, Peoria, IL (US);
Donald Stickel, Chillicothe, IL (US);
Howard Ludewig, Groveland, IL (US)

(73) Assignee: Caterpillar Inc., Deerfield, IL (US)

( * ) Notice: Subject to any disclaimer, the term of this patent is extended or adjusted under 35 U.S.C. 154(b) by 808 days.

(21) Appl. No.: 14/739,785

(22) Filed: Jun. 15, 2015

(65) Prior Publication Data

US 2016/0361778 A1    Dec. 15, 2016

(51) Int. Cl.
*B23K 23/00*    (2006.01)
(52) U.S. Cl.
CPC ..................... *B23K 23/00* (2013.01)
(58) Field of Classification Search
CPC .... B23K 23/00; B23K 31/02; B23K 15/0066;
B23K 28/00; B23K 33/00; B23P 6/005;
F01D 5/005; Y10T 29/49318; C12Q
1/6886; C12Q 2600/154
USPC .............. 219/99, 119, 157; 228/42, 50, 216;
148/23, 26; 264/230, 342 R
See application file for complete search history.

(56) References Cited

U.S. PATENT DOCUMENTS

| 3,138,863 | A | | 6/1964 | Clark et al. | |
|---|---|---|---|---|---|
| 3,669,335 | A | * | 6/1972 | Arikawa | B23K 9/035 148/23 |
| 5,158,225 | A | * | 10/1992 | Ksioszk | B23K 37/04 219/160 |
| 5,653,856 | A | * | 8/1997 | Ivanov | B23K 35/025 204/192.12 |
| 5,944,247 | A | * | 8/1999 | Jankus | B23K 37/06 228/42 |
| 6,189,482 | B1 | * | 2/2001 | Zhao | C23C 16/4401 118/715 |

FOREIGN PATENT DOCUMENTS

FR    2308282 A7    11/1976
JP    6174796 A    4/1986

* cited by examiner

*Primary Examiner* — Dana Ross
*Assistant Examiner* — Joseph W Iskra
(74) *Attorney, Agent, or Firm* — Miller, Matthias & Hull (57) ABSTRACT

A weld kit is presented for use in creating a weld with limited access to a structure. The weld kit contains a back plate being a combination of a thermic material attached to a metallic material. Additionally, the weld kit has a lowering device secured to the back plate. A plurality of tacking nodes travel through both the thermic material and the metallic material of the back plate. The plurality of tacking nodes are operative to accept and distribute heat from a welding arc to create a tack weld at a location where at least one of the plurality of tacking nodes contacts a weld joint. The presented weld kit may be used to repair a damaged enclosed structure. Additionally, the presented weld kit may also be used to create an enclosed structure in a manufacture type environment.

10 Claims, 10 Drawing Sheets

WELD KIT AND METHOD FOR LIMITED ACCESS WELD JOINTS

TECHNICAL FIELD

The present disclosure generally relates to a weld kit, and more particularly relates to a weld kit which can repair or create strong welds in areas with limited access from the backside of weld joints.

BACKGROUND

Welding is an important operation in producing and maintaining the structural integrity of any structure. Welding is a process by which different materials are joined by fusion. Materials heated to a melting point form a molten pool of material that then can cool to form a weld joint. The materials usually used to form a weld include a base material and a type of filler that when melted together form the molten pool. Through such a welding process, the joint can be formed to be as strong as the base material that was used to form the weld.

There are many methods used in modern industries that can create welds. Gas metal arc welding is one such method. During the gas metal arc welding process, an electric arc forms between a consumable wire electrode and the base material. Receiving power from a constant voltage direct current source, the electric arc heats the base material causing the base material to melt along with the wire electrode to form a molten pool. When the molten pool cools a weld is formed. Throughout the welding process shielding gas is used to protect the gas metal arc welding process from airborne contaminants.

One of the more difficult structures to weld or to repair is a structure in which an enclosed box is present. Ideally, a weld operator would like to have access to the back of a weld joint to properly strengthen the weld and place a backing material so that the molten material does not fall into the structure. However, if damage occurs to an enclosed box structure or when manufacturing the final side of an enclosed box structure access to the back side of the weld joint is not always possible. To remedy this, and affix a suitable backing for the molten pool, a steel plate is usually placed inside the box structure and attached to the sides of the weld joint. The weld is then performed filling in the weld joint and fixing the damaged box structure.

Depends on weld joint type, geometry and direction of loading, welds are assigned a fatigue class value to determine the strength of the weld created. The higher the alphabetic value of the fatigue class, the shorter fatigue life of the weld. While such a process is effective in forming a weld, attaching a steel plate to the back of a box structure to be repaired or produced can process weaker welds that may receive a low fatigue class rating of F2 to F. By way of background, it should be noted that when the weld is created in such a method the steel plate used to hold the molten pool actually becomes part of the weld as part of the steel plate melts to become part of the molten pool. This leads to the steel backing plate no longer being flush to the backside of the weld joint and actually attached to the box structure at the back of the weld joint. Such welds can lead to weld failure due to the additional stress incurred at the weld roots by this type of weld.

Additionally, weld repair for boxed structures may involve small weld joints and weld joints that are difficult to access. Because of this it may be difficult to place a steel backing material on the backside of a weld joint to produce a traditional repair weld. French Patent Application FR2308282A7 attempts to solve this limited access problem that exists regarding boxed structures. In FR2308282A7 an upper hook can lower down a steel backing plate and hold it flush against the backside of the weld zone so that the operator can complete the weld needed to repair the sealed box structure. However, this method only produces the lower class welds described above since a steel plate is used to support the back of the weld pool.

Therefore, it would be advantageous to develop a new type of welding apparatus and method in which a user can not only fix or create a weld on an enclosed box structure, but also develop a welding apparatus and method which can additionally create a weld having a stronger fatigue class value thereby improving the strength and operational life of the weld.

SUMMARY OF THE DISCLOSURE

In one aspect of the disclosure, a weld kit is disclosed for use in creating weld with limited access to a structure. The weld kit contains a back plate. The back plate is a combination of a thermic material attached to and placed above a metallic material. Additionally the weld kit has a lowering device. The lowering device is secured to the back plate. Also included within the weld kit is a plurality of tacking nodes. The plurality of tacking nodes travel through both the thermic material and the metallic material of the back plate, and help secure the thermic material to the metallic material of the back plate.

In another aspect of the disclosure, a weld method to repair an enclosed structure is disclosed. First, a weld joint is formed by removing a damaged portion of the enclosed structure. Next, a back plate is attached to a lowering device. The back plate is a combination of thermic material attached to and placed above a metallic material. Then, the back plate is lowered through the root opening of a weld joint with the lowering device. The back plate with the lowering device is positioned to be parallel and in contact with an underside of the weld joint inside the enclosed structure. Next, a first tack weld is produced to attach a first tacking node of a plurality of tacking nodes to a side edge of the weld joint. The plurality of tacking nodes travel through both the thermic material and the metallic material of the back plate and help secure the thermic material to the metallic material of the back plate. Then, a second tack weld is produced to attach a second tacking node of the plurality of tacking nodes to an opposite side edge of the weld joint. Finally, the damaged portion of the enclosed structure is welded to complete the repair.

In yet another aspect of the disclosure, a weld method to create an enclosed structure is disclosed. First, a back plate is placed behind a first installation plate. The back plate is a combination of thermic material attached to and placed above a metallic material. Then, the back plate is attached to the first installation plate by a first tack weld with a first tacking node of a plurality of tacking nodes to the first installation plate. The plurality of tacking nodes travel through both the thermic material and the metallic material of the back plate and help secure the thermic material to the metallic material of the back plate. Next, the first installation plate is installed with the attached back plate as a first part of a side wall of the enclosed structure. Then, a second installation plate is installed next to the first installation plate as a second part of the side wall of an enclosed structure.

Finally, the first installation plate is welded to the second installation plate thereby enclosing and completing the enclosed structure.

These and other aspects and features of the present disclosure will be more readily understood when reading the following detailed description taken in conjunction with the accompanied drawings.

It should be understood that the drawings are not necessarily to scale and that the disclosed embodiments are illustrated diagrammatically and in partial views. It should be further understood that this disclosure is not to be limited to the particular embodiments illustrated herein.

DETAILED DESCRIPTION

Figure 1:
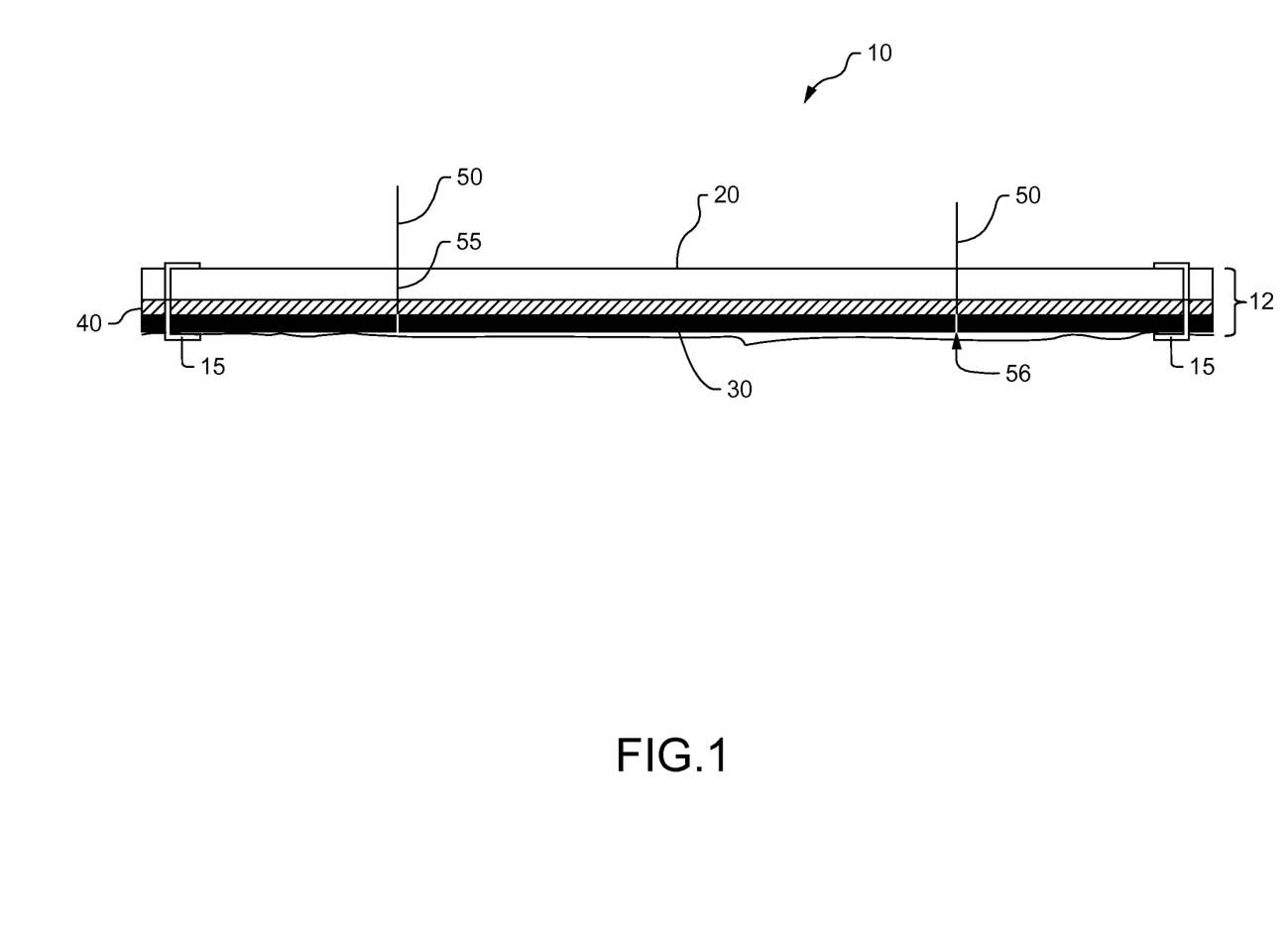
FIG. 1 is a side view of a back plate of a weld kit in accordance with one embodiment of the present disclosure.

Referring now to the drawings and with specific reference to FIG. 1, a weld kit constructed in accordance with the present disclosure is generally referred to by reference numeral 10. The weld kit 10 may include a back plate 12 and a plurality of tacking nodes 15. The back plate 12 has a thermic material 20 placed onto a metallic material 30. The thermic material 20 may be any type of material suitable to protect the bottom metallic material 30 from extensive heat transfer. Additionally the thermic material 20 may be any material which will not melt during a welding process and will not become part of the weld pool when welding occurs. In an embodiment of the present disclosure, the thermic material 20 is a ceramic material, but other materials or substances having the properties disclosed above may be used. The thermic material 20 may be formed as one contiguous piece or a plurality of pieces of thermic material 20 positioned next to one another. A metallic material 30 is then attached to the thermic material 20. The metallic material 30 may be made of any type of metal suitable for a welding operation. However, in an embodiment of the present disclosure the metallic material 30 is a steel plate. Additionally the metallic material 30 can vary in thickness depending on the needs of the weld operator, yet the metallic material 30 may maintain a thickness that is as small as possible for use within the weld operation so that any additionally thickness added to the backside of the welded structure is minimal.

To attach the thermic material 20 to the metallic material 30 a tape 40 is used. The tape 40 may be an extremely thin layer. Additionally, the tape 40 may be a made of a metallic composition such as but not limited to aluminum foil. To attach the thermic material 20 to the tape 40, a top side of the tape 40 is placed covered with an adhesive. The thermic material 20 is then placed on top of the adhesive covered top side of the tape 40 attaching the tape 40 to the thermic material 20. The tape 40 is placed in such a way that the tape 40 is longitudinally larger than the width of the thermic material 20. The excess sides of the tape 40 which are covered with adhesive are then folded downward. The excess sides of the tape 40 fold on top of one another attaching the tap 40 to itself underneath the thermic material 20. By folding the excess sides of the tap 40 over and onto itself, at least one of the excess sides of the tape 40 covered with adhesive is facing downward. The downward facing excess sides of the tape 40 covered with adhesive is then placed on top of a metallic material 30, attaching at least one of the excess sides of the tape 40 to the metallic material 30. Using the tape 40 in this fashion attaches the thermic material 20 to the metallic material 30 to form the completed back plate 12.

Also present as part of the weld kit 10 is a plurality of tacking nodes 15. The plurality of tacking nodes 15 may be many shapes or materials depending on the purpose and the structure of the weld to be created. The plurality of tacking nodes 15 run through both the thermic material 20 and the metallic material 30 and extend out the top and the bottom of the back plate 12. The plurality of tacking nodes 15 provide different functional advantages to the back plate 12. First, the plurality of tacking nodes 15 are used to help secure the thermic material 20 to the bottom of a weld joint when creating or repairing a weld. Additionally, the thermic material 20 may or may not be formed as one contiguous piece. Therefore, multiple pieces of thermic material 20 may be placed alongside one another to create a sufficient backing of thermic material 20 to cover the opening of the weld joint. To provide stiffness and proper backing for attachment to the weld joint, the multiple pieces of thermic material 20 may then be placed on the metallic material 30 of the back plate 12. Use of the plurality of tacking nodes 15 running through the thermic material 20 and the metallic material 30 in this fashion helps keep the thermic material 20 and the metallic material 30 aligned when the back plate 12 is placed into a welding position. To help facilitate this function the plurality of tacking nodes 15 may have a multitude of varying shapes.

The plurality of tacking nodes 15 may be made from many materials, but the materials used for the plurality of tacking nodes 15 should be suitable for a tack weld to occur connecting the upper portion of the plurality of tacking nodes 15 to the weld joint of a structure. In an embodiment of the present disclosure, the plurality of tacking nodes 15 may be gas metal arc welding electrodes. When a tack weld occurs with the plurality of tacking nodes 15, the material used for the plurality of tacking nodes 15 must be able to melt to form part of the molten pool which will become the weld joint of the structure.

Another feature present as part of the weld kit 10, is a lowering device 50. The lowering device 50 may be any type of device capable of holding the back plate 12 and lowering the back plate 12. To attach the back plate 12 to the lowering device 50, at least one hole 55 may perforated into and through the back plate 12 allowing the lowering device 50 to be securely attached to the back plate 12. The lowering device 50 may be secured to the back plate by a knot 56 or other securing means to prevent the lowering device 50 from dislodging from the back plate 12 when the back plate 12 is placed into a welding position.

Figure 2:
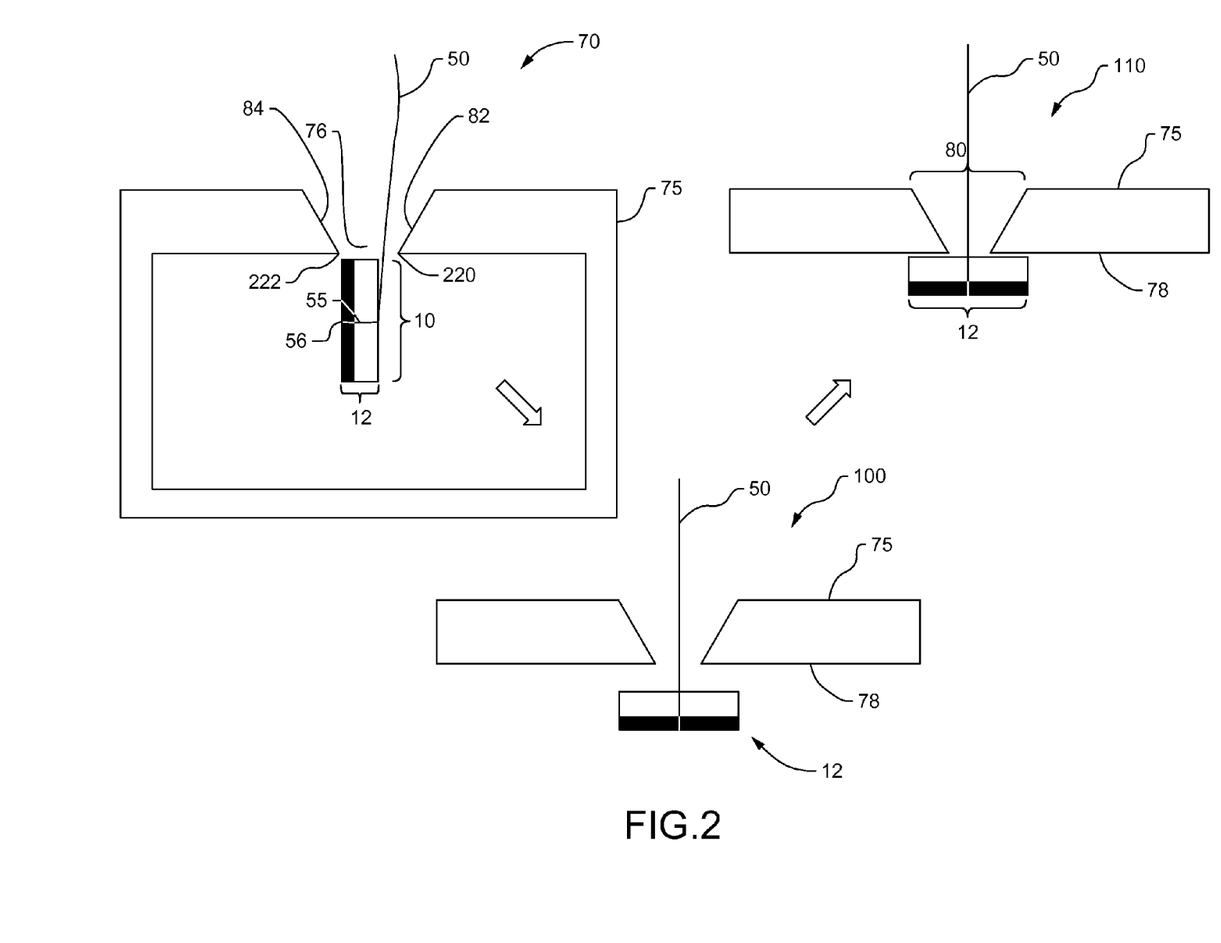
FIG. 2 is a schematic illustrating a sequence of steps to lower the back plate of a weld kit into a structure in accordance with one embodiment of the present disclosure.

Turning now to FIG. 2, a sequence of views are provided to show how the weld kit 10 can be used to repair or create a weld. In area 70, a structure 75 is shown having no access to a back side 76 of a weld joint 80. The structure 75 may be an enclosed box like structure as mentioned above. Additionally, the structure 75 may have limited access to the area where the weld may occur. The industrial settings where such a framework might present itself are myriad. For example, in the construction of earth-moving components, various frames, shrouds, and panels may be provided whose welds are required in locations with very limited access. The present disclosure solves this problem.

Referring again to FIG. 2, a weld joint 80 is viewed on the top portion of the structure 75. If the structure 75 previously had an older weld or damage, the sides 82 and 84 of the weld joint 80 can be gouged out or otherwise disturbed or scored to create room for the new weld. In order to gain proper access, the weld kit 10 allows the back plate 12 to be lowered into the structure 75 in area 70. The weld kit 10 does so by including a lowering device 50 to lower the back plate 12 into the enclosed structure 75. The lowering device 50 may be any type of device capable of holding the back plate 12 and lowering the back plate 12 into the structure 75. The lowering device 50 may also be operative to rotate the back plate 12 such that after the back plate 12 has been lowered into the structure 75, the back plate 12 can be placed into the correct position for welding.

In an embodiment of the present disclosure fishing line is used as the lowering device 50. The lowering device 50 is strung through an opening in the back plate 12 and secured against refraction by way of a knot 56 or the like. However, in other embodiments other lowering devices such as those having greater or lesser tensile strength and structural soundness may be used depending on the operational conditions and the weight of the back plate being used for the welding process.

As seen in sequence area 100, still in FIG. 2, after the back plate 12 has been lowered into the structure 75 and passes the weld joint 80 with sufficient clearance, the back plate 12 is rotated by a degree such as ninety degrees. By so rotating the back plate 12, the back plate 12 is placed in parallel with the underside 78 of the structure 75 where the weld will occur. In the depicted embodiment with horizontal disposition of the structure 75 and stringed attachment of the back plate 12 to the lowering device 50, the back plate 12 rotates simply at the direction of gravity. However, in other embodiments, more proactive mechanisms such as but not limited to springs, deflectors, or positioners can be so employed with similar efficiency.

Once rotated, the back plate 12 is then raised back up by the lowering device 50 as shown in sequence 110. When the lowering device 50 is raised up, the back plate 12 is then held in contact with the underside 78 of the top portion of the structure 75 where the weld will occur. When the back plate 12 is placed in this final position, the tack welding process may then begin.

Figure 3:
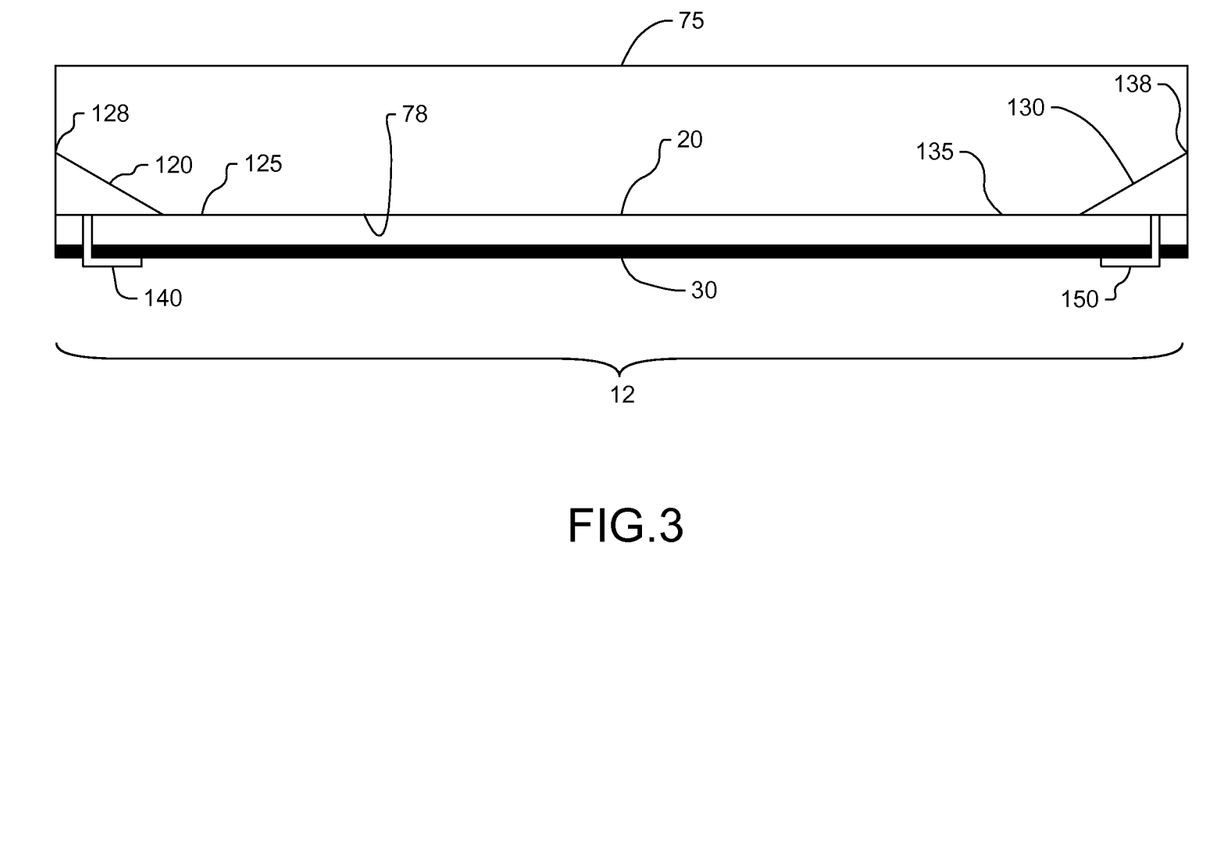
FIG. 3 is a side view of the back plate placed in a welding position against the underside of a top portion of a structure in accordance with one embodiment of the present disclosure.

FIG. 3 shows the back plate 12 in position against the underside 78 of the top portion of the structure 75. In this position a weld operator can connect the back plate 12 to the top portion of the structure 75 by producing at least two tack welds 120 and 130 at each end of the weld joint. The first tack weld 120 can attach a left side 125 of the back plate 12 to the start end 128 of the weld joint 80. The first tack weld 120 welds a first tacking node 140 of the plurality of tacking nodes 15 to the start end 128 of a joint weld. By welding this first tacking node 140 in this fashion, the first tacking node 140 attaches to the start end 128 of a joint weld of the weld joint 80 and holds the back plate 12 in position. Additionally, the first tack weld 120 heats the first tacking node 140 so that the first tacking node 140 becomes part of the first tack weld pool.

On the opposite side, a second tack weld 130 is created attaching the back plate 12 to the underside 78 of the top portion of the structure 75. The second tack weld 130 can attach the right side 135 of the back plate 12 to the stop end 138 of the weld joint 80. The second tack weld 130 welds the second tacking node 150 to the stop end 138 of the joint weld. By welding the second tacking node 150 in this fashion, the second tacking node 150 attaches to the stop end 138 of the joint weld and holds the back plate 12 in position. Additionally, the second tack weld 130 heats the second tacking node 150 so that the second tacking node 150 becomes part of the second tack weld pool.

Figure 4:
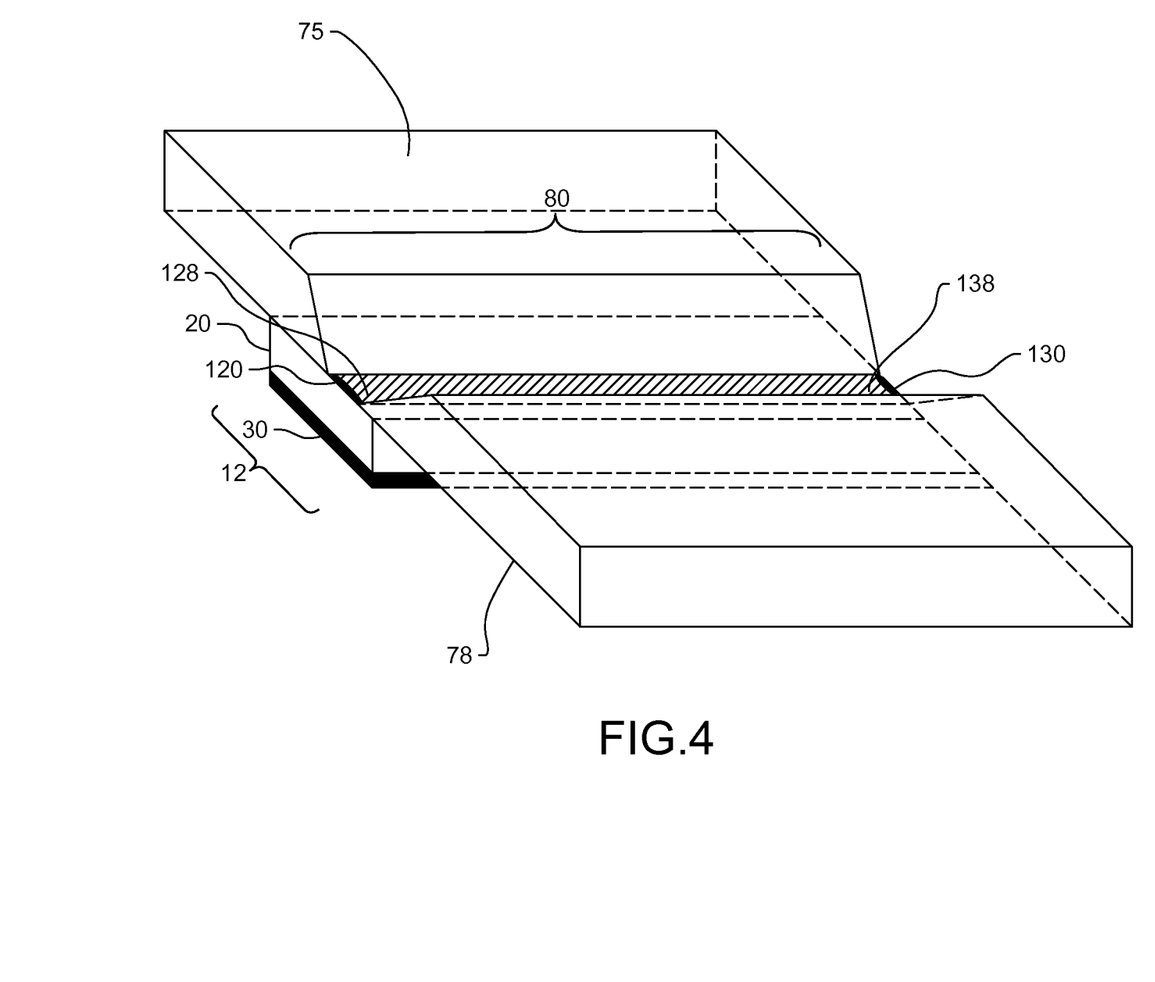
FIG. 4 is a top down view of the back plate placed in a welding position against the underside of a top portion of a structure in accordance with one embodiment of the present disclosure.

In an operational setting, FIG. 4 shows a top down view of the back plate 12 positioned inside a structure 75 to cover a weld joint 80. The back plate 12 covers the entire length of the weld joint 80. A first tack weld 120 as described above attaches the back plate 12 to a start end 128 of the weld joint 80. At the opposite end, a second tack weld 130 as described above attaches the back plate 12 to the stop end 138 of the weld joint 80. Once the back plate 12 is attached in a configuration such as this, the weld joint 80 may be completed with a proper weld to repair or attach the opposite sides of the structure 75 to one another.

Figure 5:
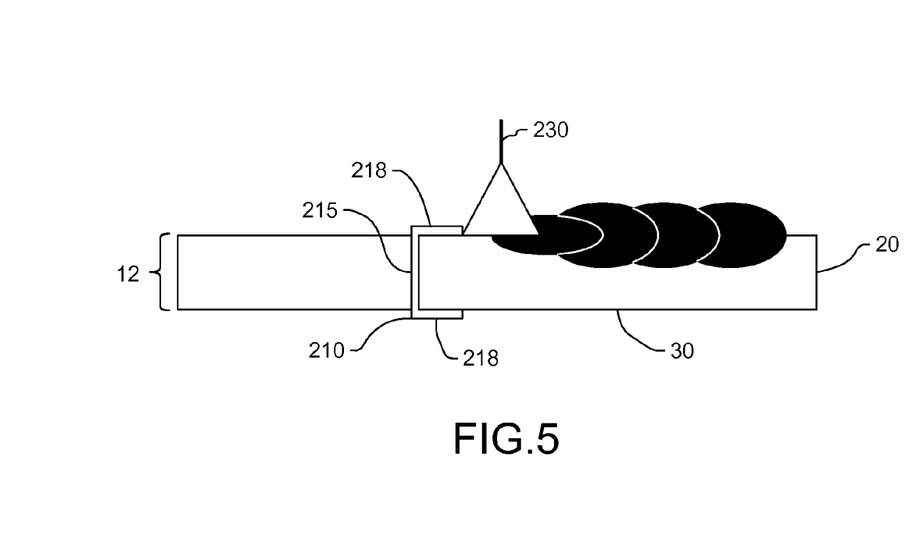
FIG. 5 is a side view of the back plate having a plurality of U-shaped tacking nodes in accordance with one embodiment of the present disclosure.

As stated earlier, the shape of the plurality of tacking nodes 15 can be adjusted. Additionally, the location of the plurality of tacking nodes 15 throughout the back plate 12 can be adjusted as well. As seen in FIG. 5, one such shape as disclosed in an embodiment of the present disclosure is a U-shaped tacking node 210. Using a U-shaped tacking node 210, the bottom section 215 of the U-shaped tacking node 210 extends through both the thermic material 20 as well as the metallic material 30. The upper extending ends 218 forming the U-shaped tacking node 210 extend horizontally to the back plate 12 both above the thermic material 20 and below the metallic material 30 and help keep the thermic material 20 and the metallic material 30 of the back plate 12 in the correct position.

Figure 6:
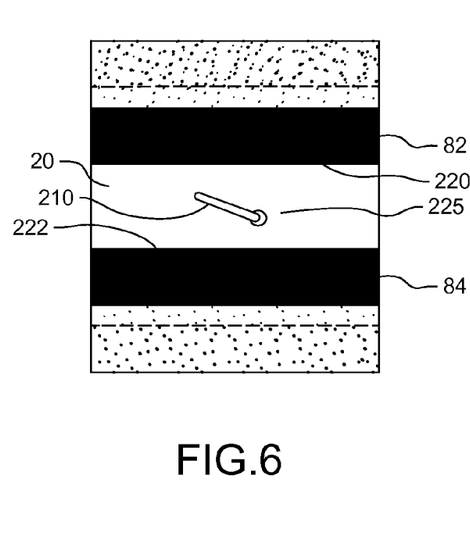
FIG. 6 is a top down view of the back plate having a plurality of U-shaped tacking nodes in accordance with one embodiment of the present disclosure.

In FIG. 6, the U-shaped tacking node 210 is viewed top down in the middle 225 of the thermic material 20 between the left front edge 220 of the weld joint 80 and the right front edge 222 of the weld joint 80. A welding arc 230, as seen in FIG. 5, can then move over the U-shaped tacking node 210 and attach the U-shaped tacking node 210 to either the left front edge 220 or right front edge 222 of the weld joint 80. If a U-shaped tacking node 210 is used, the welding arc 230 could attach the U-shaped tacking node 210 to at least one if not both the left front edge 220 and the right front edge 222 of the weld joint 80 if the weld joint 80 is small. However, with a U-shaped tacking node 210 the welding arc 230 may cause the top portion of the U-shaped tacking node 210 to be burnt away as the welding arc 230 travels and thereby detaching the U-shaped tacking node 210 from the back plate 12. If the U-shaped tacking node 210 detaches in such fashion, a tack weld cannot occur since the thermic material 20 cannot attach to the left front edge 220 or the right front edge 222 of the weld joint 80. To help keep the U-shaped tacking node 210 from detaching in this fashion, the left front edge 220 and the right front edge 222 of the weld joint may be a beveled surface. The beveled surface may extend from both the left front edge 220 or the right front edge 222 continuing up the sides 82 and 84 of the weld joint 80 and ending at the top end of the sides 82 and 84 of the weld joint 80. The use of a beveled surface on the sides 82 and 84 of the weld joint 80 facilitates easier attachment of the U-shaped tacking node 210 to either the left front edge 220 or the right front edge 222 of the weld joint 80.

Figure 7:
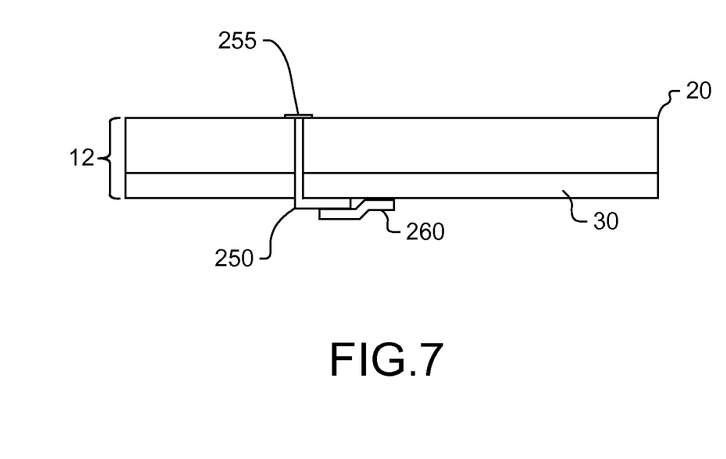
FIG. 7 is a side view of the back plate having a plurality of L-shaped tacking nodes in accordance with one embodiment of the present disclosure.

To remedy this situation, it may be possible to use an L-shaped tacking node 250 as seen in FIG. 7. With an L-shaped tacking node 250, the bottom of the L-shaped tacking node 250 extends horizontally to the back plate 12 below the metallic material 30. The upper portion of the L-shaped tacking node 250 may extend through both the metallic material 30 and the thermic material 20 of the back plate 12. At the top of the upper portion of the L-shaped tacking node 250, the L-shaped tacking node 250 may have a flat profile 255. An aluminum tape 260 is used to hold the L-shaped tacking node 250 in the correct position from backside when tack welding occurs.

Figure 8:
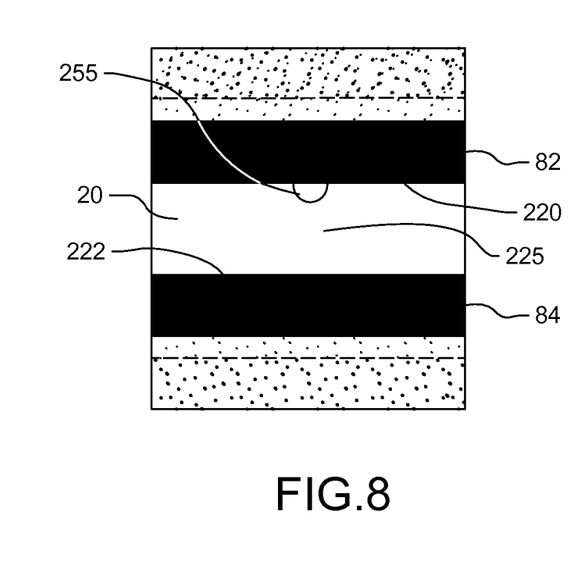
FIG. 8 is a top down view of the back plate having a plurality of L-shaped tacking nodes in accordance with one embodiment of the present disclosure.

Additionally, as seen in FIG. 8 the L-shaped tacking node 250 does not have to be positioned in the center 225 of the weld joint 80. Depending on the accuracy of the weld needed and the skill of the welder, the L-shaped tacking node 250 may be positioned as close as possible to the left front edge 220 or the right front edge 222 of the weld joint 80 for proper attachment to the weld joint 80. In this type of configuration an L-shaped tacking node 250 with a flat profile 255 at the top portion of the L-shaped tacking node 250 may be used. The L-shaped tacking node 250 is no longer located in the center 225 of the thermic material 20, but located close to the left front edge 220 of the weld joint 80 where the connection can occur. When the welding arc 230 passes over the flat profile 255 of the L-shaped tacking node 250, the flat profile 255 easily attaches to either the left front edge 220 or right front edge 222 of the weld joint 80 and does not detach from the back plate 12. Additionally, when using an L-shaped tacking node 250 the sides 82 and 84 of the weld joint 80 may also be a beveled surface. Just like use with the U-shaped tacking node 210, the beveled surface may extend from both the left front edge 220 or the right front edge 222 continuing up the sides 82 and 84 of the weld joint 80 and ending at the top end of the sides 82 and 84 of the weld joint 80. The use of a beveled surface on the sides 82 and 84 of the weld joint 80 facilitates easier attachment of the L-shaped tacking node 250 to either the left front edge 220 or the right front edge 222 of the weld joint 80.

INDUSTRIAL APPLICABILITY

From the foregoing, it may be appreciated that the weld kit disclosed herein may have industrial applicability in a variety of setting such as, but not limited to, use in preparing and creating welds within enclosed box structure. Such a weld kit may also be used to create welds within any type of enclosed configuration such as machine frames, pipes or other enclosed structure which have curved sides. Such a weld kit can be employed in any type of industry that facilitates the use of welds in their production and maintenance. Such industries may include manufacturing earth-moving equipment, building construction, automotive, trucking, rail, agriculture, shipbuilding, pipeline, drainage and sewer maintenance, underwater maintenance or recreational use or the like that may be require creating or repair of a welded structure.

In operation, the weld kit 10 may be used for either creation or repair of a weld on a structure 75. As viewed in FIG. 9, a weld method to repair an enclosed structure 75 according to the present disclosure is depicted in flow chart fashion. First, in block 300, a weld joint 80 is gouged out or otherwise removed from a damaged portion of the enclosed structure 75. Next, in block 310, a back plate 12 is attached to a lowering device 50. The back plate 12, as stated above, is a combination of thermic material 20 attached to and placed above a metallic material 30. To attach the back plate 12 to the lowering device 50, the at least one hole 55 may be drilled through the back plate 12. The lowering device 50, which may be fishing line, is then placed through the at least one hole 55 and secured as by knot 56 so that it may attach and hold the back plate 12 when it is lowered through the weld joint 80. Then, in block 320 the lowering device 50 positions the back plate 12 to be parallel and in contact with the underside 78 of the weld joint 80 inside the enclosed structure 75. To position the back plate 12 in such a fashion, the lowering device 50 lowers the back plate 12 through the weld joint 80 and into the interior of the enclosed structure 75. The lowering device 50 may then rotate the back plate 12 into the correct position to be parallel with the underside 78 of the weld joint 80 as by gravity, or a more proactive means. Then the lowering device 50 raises the back plate 12 so that the back plate 12 is in contact with the underside 78 of the weld joint 80 inside the enclosed structure 75.

Figure 9:
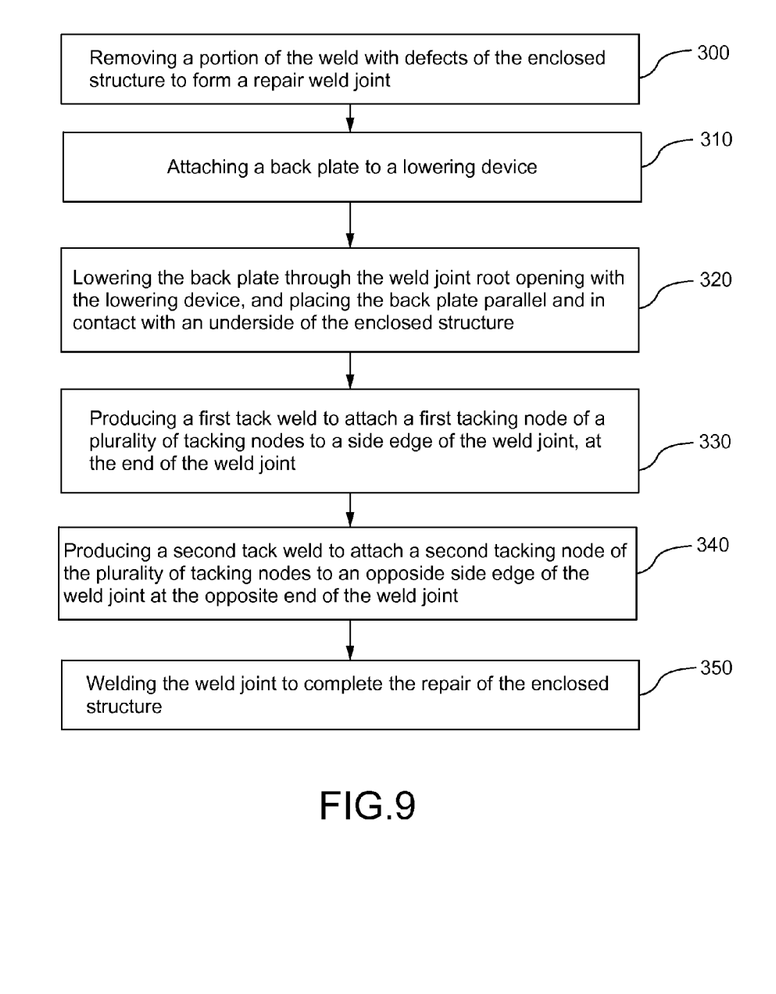
FIG. 9 is a flowchart that exemplifies one weld method to repair an enclosed structure in accordance with one embodiment of the present disclosure.

To execute a repair weld of significant fatigue class strength, the back plate 12 may positioned so that the thermic material 20 of the back plate 12 is the side of the back plate 12 that is in contact with the underside 78 of the weld joint 80 inside the enclosed structure 75. Next, in block 330 a first tack weld 120 is created to attach a first tacking node 140 of the plurality of tacking nodes 15 to a side edge of the weld joint 80. The plurality of tacking nodes 15 travel through both the thermic material 20 and the metallic material 30 of the back plate 12 and help secure the thermic material 20 to the metallic material 30 of the back plate 12. Also, when the first tack weld 120 is created, the weld heats the first tacking node 140 of the plurality of tacking nodes 15 into a molten state.

Then in block 340, a second tack weld 130 is created to attach a second tacking node 150 of the plurality of tacking nodes 15 to the opposite side edge of the weld joint 80. Just like the first tack weld 120, the second tack weld 130 heats the second tacking node 150 of the plurality of tacking nodes 15 into a molten state. At this point with the back plate 12 secured to the structure 75 by both the first tack weld 120 and the second tack weld 130, the lowering device 50 is removed. Finally in block 350, the weld joint 80 of the damaged portion of the enclosed structure 75 is welded to complete the repair as explained below.

Figure 10:
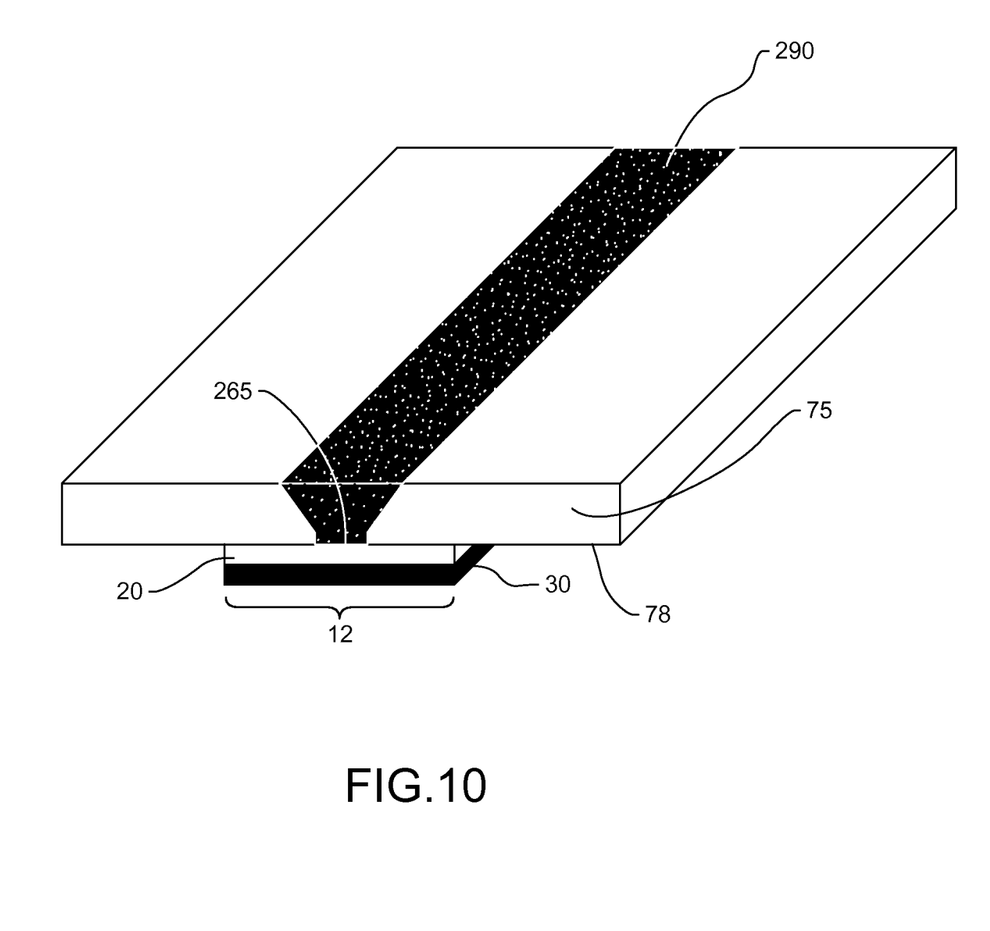
FIG. 10 is an illustrative view showing a weld joint having a higher fatigue class value than a traditional weld joint in accordance with the disclosed weld method to repair an enclosed structure in an embodiment of the present disclosure.

More specifically, FIG. 10 illustrates the finished weld that may be created when the damaged portion of the enclosed structure is welded to complete the repair. In traditional welding repair methods a steel back plate becomes attached to the weld underside of the weld joint. In such traditional welding repairs, an F class weld is created such that the steel plate attaches to the weld underside of the F class weld. The steel plate is attached to the weld underside of the F class weld because when the F class weld is created the welding arc melts the steel plate and the steel plate becomes part of the molten weld pool that cools into the F class weld. F class welds have a lower fatigue value rating that welds created with the above disclosed weld kit and method. In the above disclosed method, as seen in FIG. 10, a potential D class weld 290 is created. The potential D class weld 290 is created because when the back plate 12 is attached to the weld underside 265 of the potential D class weld 290, the thermic material 20 is positioned to cover the weld underside 265 of the potential D class weld 290. As the welding arc 230 passes over the potential D class weld 290, the thermic material 20 will not melt and become part of the molten pool to which would later cool to form the potential D class weld 290. Therefore, the only materials that create the potential D class weld 290 are the base material of the structure 75 and the filler material of the potential D class weld 290. The back plate 12 does not form part of the potential D class weld 290. The back plate 12 of the weld kit 10 remains within the structure 75, and attached to the structure 75 by the first tack weld 120 and the second tack weld 130. Unlike traditional welds, the back plate 12 does not form part of the molten pool used to create the potential D class weld 290. Creating a potential D class weld 290 in such fashion produces a weld with a higher fatigue class value than traditional welding methods.

Figure 11:
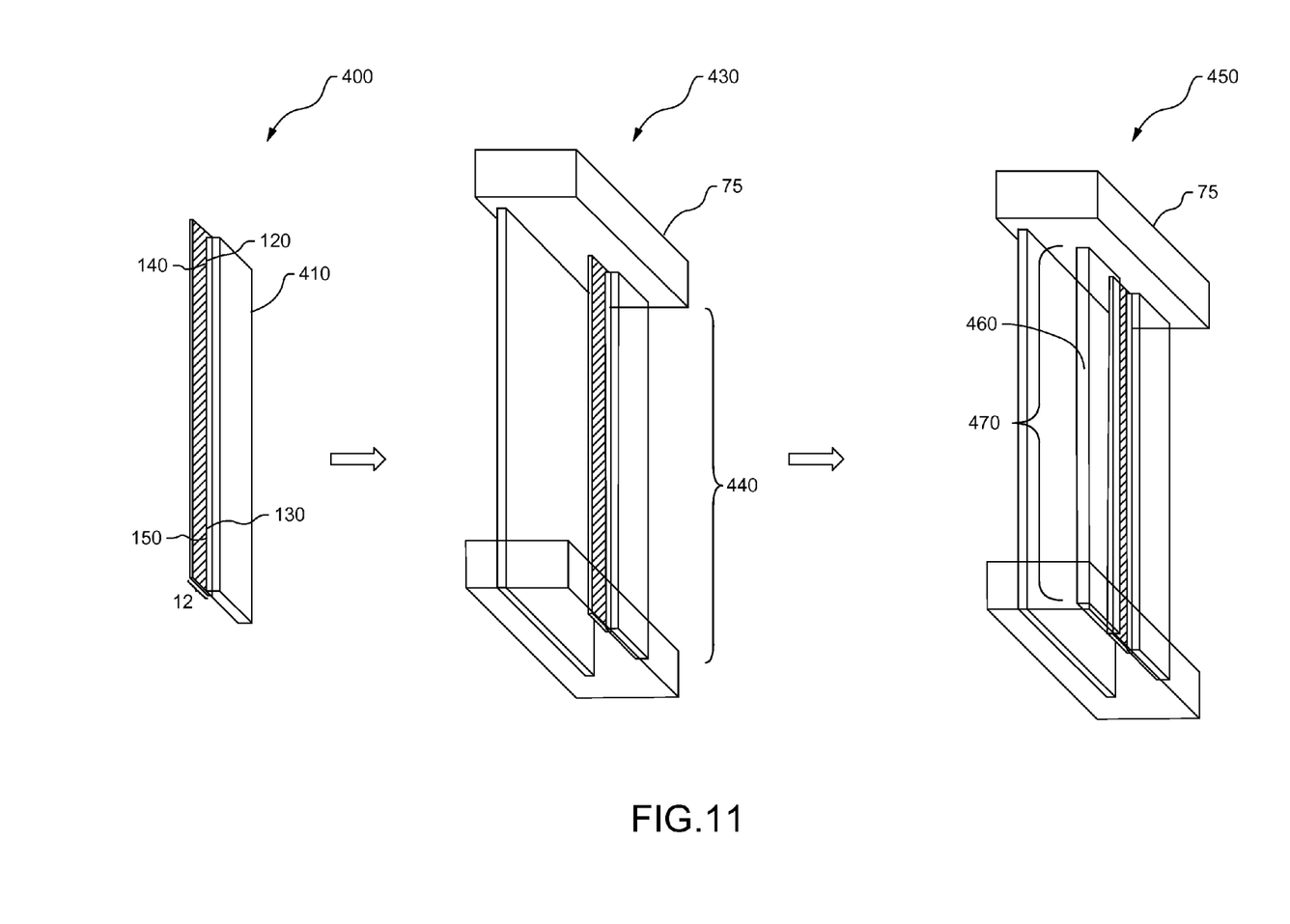
FIG. 11 is a side view of illustrated steps to create an enclosed structure with use of a weld kit in accordance with one embodiment of the present disclosure.

Additionally, the weld kit 10 may be used to create a weld in an original equipment manufacturer (OEM) type setting to complete an enclosed structure 75. For example, in the construction of earth moving equipment such as but not limited to a motor grader, the fame of such equipment may be formed from an enclosed box beam or the like. In area 400 of FIG. 10, a first installation plate 410 is viewed attached to a back plate 12. The back plate 12 attaches to the first installation plate 410 by a first tack weld 120 on a first tacking node 140 of the plurality of tacking nodes 15. Additionally, the back plate 12 attaches to the first installation plate 410 by a second tack weld 130 on a second tacking node 150 of the plurality of tacking nodes 15. At least a first tack weld 120 and a second tack weld 130 are needed to securely attach the back plate 12 to the first installation plate 410. In area 430 the first installation plate 410 is viewed as a first part 440 of a side wall of an enclosed structure 75. The first installation plate 410 with the back plate 12 attached is installed to form a first part 440 of the side wall of the enclosed structure 75. Finally, area 450 shows a second installation plate 460, forming a second part 470 of the side wall of the enclosed structure 75, being placed next to the first installation plate 410 with the attached back plate 12. Placing the second installation plate 460 next to the first installation plate 410 completes the creation of the final side wall of the enclosed structure 75.

Figure 12:
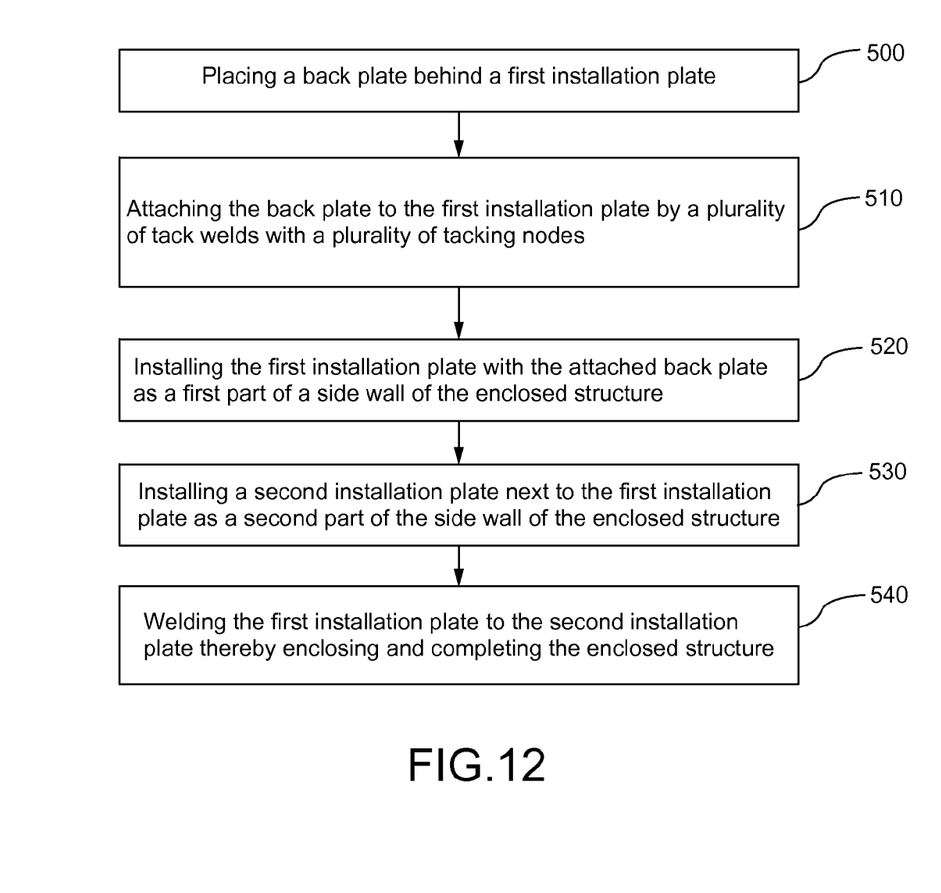
FIG. 12 is a flowchart that exemplifies one weld method to create an enclosed structure in accordance with one embodiment of the present disclosure.

FIG. 12, shows a succession of steps regarding the disclosed weld method to create an enclosed structure 75 as viewed in FIG. 7. First, in block 500, a back plate 12 is placed behind a first installation plate 410. The back plate 12 as stated earlier is a combination of thermic material 20 attached to and placed above a metallic material 30. Next, in block 510 the back plate 12 is attached to the first installation plate 410 by a plurality of tack welds. The first tack weld 120 welds a first tacking node 140 of the plurality of tacking nodes 15 to the first installation plate 410. Additionally, a second tack weld 130 welds a second tacking node 150 of the plurality of tacking nodes 15 to the first installation plate 410. At least a first tack weld 120 and a second tack weld 130 are needed to securely attach the back plate 12 to the first installation plate 410. The plurality of tacking nodes 15 travel through both the thermic material 20 and the metallic material 30 of the back plate 12 and help secure the thermic material 20 to the metallic material 30 of the back plate 12. When the first tack weld 120 and the second tack weld 130 is created to attach the back plate 12 to the first installation plate 410, the first tack weld 120 and the second tack weld 130 occur on the thermic material 20 of the back plate 12. Additionally, when attaching the back plate 12 to the first installation plate 410 by the first tack weld 120 and the second tack weld 130, the first tack weld 120 and the second tack weld 130 heat the first tacking node 140 and the second tacking node 150 respectively of the plurality of tacking nodes 15 into a molten state.

Next, in block 520, the first installation plate 410 with the attached back plate 12 is installed as a first part 440 of a side wall of the enclosed structure 75. Then in block 530, a second installation plate 460 is installed next to the first installation plate 410 as a second part 470 of the side wall of the enclosed structure 75. When the second installation plate 460 is installed next to the first installation plate 410 a second tack weld 130 may be creating using a second tacking node 150 to attach the second installation plate 460 to the back plate 12. Just like the first tack weld 120, the second tack weld 130 heats the second tacking node 150 of the plurality of tacking nodes 15 into a molten state.

Additionally, when the first installation plate 410 and the second installation plate 460 are installed as a first part 440 and second part 470 of the side wall of the enclosed structure 75, both the first installation plate 410 and the second installation plate 460 may be welded to the enclosed structure 75. Lastly, in block 540 the first installation plate 410 is welded to the second installation plate 460. This final weld completes the enclosed structure 75 by connecting the first part 440 and second part 470 of the side wall to become one side wall of the enclosed structure 75.

Performing welds in either a repair scenario or a manufacturing scenario provides added benefits to the weld joints that cannot be accomplishing using previous welding technology. Performing a weld with the back plate of the disclosed weld kit produces a weld of a higher fatigue class value. Traditional welding methods use a steel back plate to produce such welds and the fatigue class of those welds can be classified as either fatigue class F2 or fatigue class F. However using a back plate as disclosed in these embodiments produces a fatigue class weld value of D. This is because the thermic material of the back plate does not contribute to the weld pool and then when cooled does not becomes part of the weld. Performing welds of a fatigue class value of D with such disclosed methods provides less stress risers within the weld. Additional, welds executed in this nature provided approximately 20% less plate thickness due to better fatigue life. Moreover, these types of welds cost less to produce and have a lighter structural weight. Yet, the biggest advantage of producing welds as disclosed above in the embodiments of the disclosure is that these types of welds can be produced from one side of a structure and do not require access to a back side of the structure for welding. This is particularly advantageous in welding situations for enclosed box like or pipe like structures. The ease and use of such a disclosed weld kit can make for quick and inexpensive field repair so that damaged equipment can be operational and function with little down time.

While the foregoing detailed description has addressed only specific embodiments, it is to be understood that the scope of the disclosure is not intended to be limiting. Thus, the breadth and spirit of this disclosure is intended to be broader than any of the embodiments specifically disclosed and/or encompassed within the claims appended hereto.

What is claimed is:

1. A weld kit for use in creating a weld with limited access to an enclosed structure, the weld kit comprising:
    a back plate, the back plate being a combination of a thermic element secured to a metallic element;
    a lowering device, the lowering device secured to the back plate and configured to lower the back plate into the enclosed structure; and
    a plurality of tacking nodes, the plurality of tacking nodes traveling through both the thermic element and the metallic element of the back plate and helping secure the thermic element to the metallic element of the back plate.

2. The weld kit of claim 1, wherein the thermic element is a ceramic element.

3. The weld kit of claim 1, wherein the metallic element is a steel plate.

4. The weld kit of claim 1, wherein a tape is positioned between and attaches the thermic element and the metallic element.

5. The weld kit of claim 4, wherein the tape attaches to both the thermic element and the metallic element through use of an adhesive.

6. The weld kit of claim 1, wherein the plurality of tacking nodes are a plurality of electrodes.

7. The weld kit of claim 6, wherein the plurality of electrodes each have a U-shaped configuration.

8. The weld kit of claim 6, wherein the plurality of electrodes each have a L-shaped configuration, the L-shaped configuration having a top portion with a flat profile extending above the thermic material of the back plate for each of the plurality of electrodes.

9. The weld kit of claim 1, wherein the plurality of tacking nodes is located in a center location of the back plate.

10. The weld kit of claim 1, wherein the plurality of tacking nodes is located in an off center location near at least one of the edges of the back plate.

* * * * *